US008546278B2

(12) United States Patent
Paradis et al.

(10) Patent No.: US 8,546,278 B2
(45) Date of Patent: Oct. 1, 2013

(54) COMPOSITE BOARD CONTAINING GLASS FIBER MAT

(75) Inventors: Duane Paradis, Highlands Ranch, CO (US); Mandy B. Schweitzer, Westminster, CO (US)

(73) Assignee: Johns Manville, Denver, CO (US)

(*) Notice: Subject to any disclaimer, the term of this patent is extended or adjusted under 35 U.S.C. 154(b) by 1038 days.

(21) Appl. No.: 11/904,799

(22) Filed: Sep. 28, 2007

(65) Prior Publication Data

US 2009/0110885 A1 Apr. 30, 2009

(51) Int. Cl.
*B32B 17/10* (2006.01)

(52) U.S. Cl.
USPC ............. 442/65; 442/45; 442/64; 442/66; 442/68; 442/180; 428/160

(58) Field of Classification Search
USPC ............. 428/160; 442/45, 64, 65, 66, 68, 442/180
See application file for complete search history.

(56) References Cited

U.S. PATENT DOCUMENTS

| 5,112,678 | A | * | 5/1992 | Gay et al. | 442/173 |
| 6,770,354 | B2 | * | 8/2004 | Randall et al. | 428/219 |
| 2003/0134079 | A1 | * | 7/2003 | Bush et al. | 428/74 |
| 2003/0148681 | A1 | * | 8/2003 | Fyfe | 442/65 |
| 2006/0019568 | A1 | * | 1/2006 | Toas et al. | 442/381 |
| 2006/0096205 | A1 | * | 5/2006 | Griffin et al. | 52/309.4 |

* cited by examiner

*Primary Examiner* — Peter Y Choi

(74) *Attorney, Agent, or Firm* — Robert D. Touslee

(57) ABSTRACT

A composite board including: at least one glass fiber mat having an upper surface and a lower surface; a foam layer attached to the glass fiber mat; and a first binding composition applied to the upper surface of the at least one glass fiber mat and a second binding composition applied to the lower surface of the at least one glass fiber mat, the first and second binding compositions being the same or different compositions.

21 Claims, 2 Drawing Sheets

COMPOSITE BOARD CONTAINING GLASS FIBER MAT

BACKGROUND

Many types of weather-resistant sheet materials are available for use in the building construction industry. For example, webbed sheets including tar paper and spun-bonded polyolefin house wraps are available for use as an underlayment under shingles or siding or facers for foamed insulation board laminates. In the past, webbed sheets have been made with cellulostic felt or Kraft paper which has been treated with either coal tar pitch, asphalt, or pine rosin. However, such cellulostic products typically lose their desired flatness upon contact with water, organic liquid, or other types of moisture. Similar cellulostic products are flammable and can therefore constitute fire safety hazards.

Glass fiber mats made of non-woven glass fibers can be used in place of the cellulose sheets as the facer material in laminates. In comparison with cellulose products, glass fiber mats can provide improved resistance to liquid penetration. Glass fiber mats can also maintain their shape and form upon contact with liquids and provide improved flame retardant characteristics in comparison with cellulose products.

A conventional glass fiber mat-containing laminate or composite board can have an inner layer of material set between two, outer layers of glass fiber mats. The outer surface of each glass fiber mat can be coated with a coating material to reduce porosity and increase resistance to liquid penetration. The inner surface of each glass fiber mat remains uncoated and is directly attached to the inner layer material.

Conventional glass fiber mat-containing laminate or composite boards typically exhibit undesirable characteristics such as, for example, insufficient mechanical strength, which can cause problems during the installation, use and/or maintenance of the products. For example, in roofing underlayment applications, the laminate or composite board is attached to a roofing membrane. When the roofing membrane is peeled away from the laminate/composite board, for example, to conduct maintenance on the roof, portions of the laminate/composite board can tear away with the roofing membrane due to the insufficient mechanical strength thereof. Additionally, conventional laminate/composite boards are typically susceptible to deterioration when used in high-pH applications, such as tile backing. A further disadvantage of employing conventional laminate/composite boards is that when the glass fiber mat is adhered to an insulating foam during manufacture, the surface intended to be adhered to the foam typically consumes insulating foam, thereby increasing manufacturing time and consumption of materials.

SUMMARY

According to one aspect, a composite board is provided comprising:

at least one glass fiber mat having an upper surface and a lower surface;

a foam layer attached to the at least one glass fiber mat; and a first binding composition applied to the upper surface of the at least one glass fiber mat and a second binding composition applied to the lower surface of the at least one glass fiber mat, the first and second binding compositions being the same or different compositions.

According to another aspect, a method of making a composite board is provided comprising:

applying a first binding composition to an upper surface of at least one glass fiber mat;

applying a second binding composition to a lower surface of the at least one glass fiber mat, wherein the first and second binding compositions are the same or different compositions; and attaching a foam layer to the at least one glass fiber mat.

DETAILED DESCRIPTION

Figure 1:
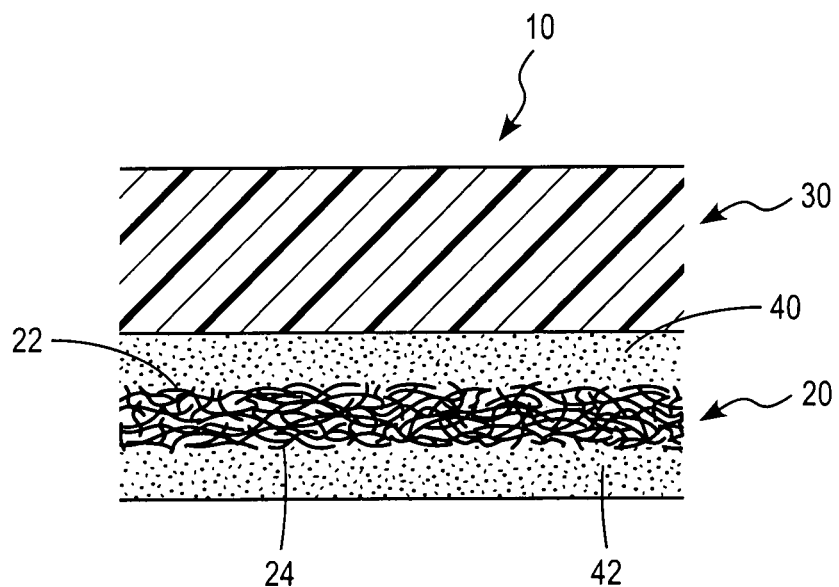
FIG. 1 is a cross-sectional view of an exemplary composite board, according to one aspect of the present invention.

Referring to FIG. 1, an exemplary composite board 10 comprises at least one glass fiber mat 20 and a foam layer 30 attached to the at least one glass fiber mat. The at least one glass fiber mat has an upper surface 22 and a lower surface 24. While the foam layer 30 is shown as being attached to the upper surface 22, it will be understood that a foam layer 30 can additionally or alternatively be attached to the lower surface 24.

The glass fiber mat 20 can include glass fibers and a binder which binds the glass fibers together and maintains the fibers in a mat form. Any type of glass fiber mat can be used in the composite board. For example, a non-woven glass fiber mat can be made with glass fibers and bonded with an aqueous thermosetting resin such as, for example, urea formaldehyde or phenolic resole resins. The glass fiber mat can be formed from any suitable process. For example, these glass fiber mats can be formed from an aqueous dispersion of glass fibers. In such process, a resin binder can be applied to a wet non-woven web of fibers and after removing excess binder and water, the web can be dried and heated to cure the resin binder to form the non-woven mat product. Non-woven glass fiber mats can also be made by chopping dry strands of glass fibers bound together with a binder to form chopped strand, collecting the chopped strand on a moving conveyor in a random pattern, and bonding the chopped strand together at their crossings by dusting a dry, powdered thermoplastic binder like a polyamide, polyester, or ethylene vinyl acetate on wetted chopped strands followed by drying and curing the binder.

The dimensional and weight characteristics of the glass fiber mat 20 are not particularly limited, and can depend on the specific application and desired properties of the composite board. For example, the basis weight of the glass fiber mat 20 can be from about 50 grams per square meter to about 150 grams per square meter. The thickness of the glass fiber mat 20 can be, for example, from about 0.015 inch to about 0.05 inch. The basis weight and thickness characteristics can be adjusted depending upon the desired rigidity, strength and weight of the composite board.

The glass fiber mat is formed from glass fibers. The length and diameter dimensions of such glass fibers are not particularly limited and can be selected based on, for example, the intended application and desired properties of the glass fiber mat. For example, the flexibility and rigidity of the glass fiber mat can depend on the selection of the dimensions of the fibers. Greater fiber diameters and fiber lengths can typically lead to a more rigid mat, whereas lesser fiber diameters and shorter fiber lengths can generally lead to a more flexible mat. The type of glass used to form the glass fibers is not particularly limited, and in an exemplary embodiment the glass fibers can be formed from E glass.

The foam layer 30 can be made of any suitable foam such as, for example, a thermosetting polymer foam. Examples of the thermosetting polymer foam include expanded polystyrene foam, polyurethane foam, phenolic foam, polyisocyanurate foam and combinations thereof. In an exemplary embodiment, the foam layer 30 includes polyisocyanurate foam. The foam layer 30 can also include at least one filler and/or extender such as a mineral filler. The characteristics of the foam layer 30 such as the thickness and density thereof can depend on the particular application and desired rigidity and strength characteristics of the composite board. For example, the foam layer can have a density of from about 1.5 pounds per cubic foot to about 25 pounds per cubic foot. The foam layer can have a thickness of from about 0.125 inch to about 6 inches.

The composite board 10 also includes a binding composition applied to the upper and lower surfaces of the glass fiber mat 20. For example, a first binding composition can be applied to the upper surface 22 of the glass fiber mat 10 and a second binding composition can be applied to the lower surface 24 of the glass fiber mat 10. The first and second binding compositions can be the same as or different from each other, and in an exemplary embodiment, the first and second binding compositions are the same compositions.

The foam layer 30 is preferably attached to the at least one glass fiber mat 20. By being attached to the glass fiber mat 20, the foam layer 30 can either be in direct contact with the glass fiber mat 20 and/or be adhered to the glass fiber mat 20 via the first and/or second binding composition applied to the glass fiber mat 20. In an exemplary embodiment, substantially an entire major surface of the foam layer 30 is attached to the glass fiber mat 20 via the first and/or second binding composition.

Referring to FIG. 1, the first and second binding compositions can form coatings 40 and 42 on the upper and lower surfaces 22 and 24 of the glass fiber mat 10, respectively. In an exemplary embodiment, one or both of the first and second binding compositions penetrate into the glass fiber mat 20 beyond the upper and lower surfaces 22 and 24 thereof, respectively. That is, in such embodiment, one or both of the first and second binding compositions do not merely remain at the surfaces of the glass fiber mat 20. The first and second binding compositions can be of a material that facilitates the penetration of the compositions into the glass fiber mat 20. The extent of the penetration of the first and second compositions can depend on the desired characteristics of the composite board 10. For example, each of the first and second binding compositions can penetrate into the glass fiber mat 20 in an amount of at least about 85%, based on the total thickness of the glass fiber mat 20. In one embodiment, the combined penetration of the first and second binding compositions can be from about 85% to 100%, based on the total thickness of the at least one glass fiber mat 20. For example, in an exemplary embodiment, the combined penetration of the first and second binding compositions is to such a degree that the glass fiber mat 20 is substantially completely impregnated with the first and/or second binding compositions. The extent of penetration of the first and second compositions can be substantially the same or different. In an exemplary embodiment, the first and second binding compositions can penetrate substantially evenly and uniformly into the at least one glass fiber mat 20.

According to one embodiment, the at least one glass fiber mat can have a coat weight from about 350 grams per square meter to about 800 grams per square meter. According to another embodiment, the at least one glass fiber mat has a coat weight greater than 800 grams per square meter. As used herein, the term "coat weight" means the weight of the coating per area of the at least one glass fiber mat.

The penetration of the first and second binding compositions into the glass fiber mat can, for example, be effective to improve the mechanical strength of the composite board. While conventional glass fiber mats have been susceptible to mechanical failure when used in certain applications, the dual-sided application and penetration of the binding compositions can be effective to reduce or eliminate the occurrence of such mechanical failure. For example, the glass fiber mats can have enhanced tensile strength and tear strength. The composite board can have improved characteristics such as increased flexural strength. The binding composition in contact with the foam layer can increase the strength of the bond between the foam layer and the at least one glass fiber mat. That is, in an exemplary embodiment, the foam layer is attached to the glass fiber mat via the first and/or second binding composition. Therefore, the glass fiber mat can be less likely to peel away from the foam layer when a membrane, such as a single ply roofing membrane or a water proofing membrane, is adhered to the free surface of at least one glass mat and later removed. For example, the binding composition in contact with the foam layer can promote adhesion between the membrane and the glass fiber mat. The composite board can also have improved flexural strength. The composite board can have improved pull through resistance and improved wind uplift performance when installed on low slope roofs. Additionally, the composite board can have a larger bending radius.

In addition, the penetration of the first and second binding compositions into the glass fiber mat can, for example, be effective to improve the degree of liquid and vapor resistance, which can in turn improve the weather resistance of the composite board. The degree of penetration of the compositions and the permeability of the glass fiber mat can be measured by the air permeability therethrough, and in an exemplary embodiment the air permeability of a single coated glass fiber mat used in the composite board is such that it takes at least 300 seconds for 300 cubic centimeters of air to pass through 1 square inch of the glass fiber mat. For example, if the composite board has a foam layer arranged between a first glass fiber mat and a second glass fiber mat, preferably the air permeability of each of the first and second coated glass fiber mats is such that it takes at least 300 seconds for 300 cubic centimeters of air to pass through 1 square inch of the glass fiber mat.

In an exemplary embodiment, the dual-sided application and penetration of the first and second binding compositions can also, for example, render the composite board suitable for use in highly alkaline environments by providing increased resistance to highly basic liquids which can typically cause the decomposition of glass fibers. For example, the composite board of the present invention can be used in bathrooms as a tile backer.

The composite board of the present invention can also be less irritating to the skin when handled. Since more glass fibers are covered or encapsulated within the glass fiber mat, the composite board can be less irritating to the hands and arms of the workers handling and installing the building material. When the composite board is cut, the board can release less glass fiber dust from the at least one glass fiber mat so that less glass fiber dust contacts exposed skin. The composite board can also be manufactured with less chemical usage and better chemical flow. For example, when the at least one glass fiber mat is adhered to the foam layer during manufacture, the amount of foam material consumed by the glass fibers is reduced or eliminated due to the dual-sided coating of the glass fiber mat. Thus, less foam may be utilized in forming the foam layer and less time may be required in manufacturing the composite board.

The first and second binding compositions can include a binder and an inorganic filler. The binder bonds the inorganic filler together and additionally bonds the inorganic filler to the glass fiber mat. The binder can include, for example, a latex binder, a starch or combinations thereof. Examples of latex binders include butyl rubber latex, styrene butadiene rubber (SBR) latex, neoprene latex, acrylic latex and SBS latex, and can in particular include the SBR latex. In one embodiment, each of the first and second binding compositions can include from about 1% latex to about 15% latex, based on the respective weight of each binding composition. In another embodiment, each of the first and second binding compositions can include from about 1% latex to about 5% latex, based on the respective weight of each binding composition. Examples of a suitable inorganic filler include calcium carbonate, clay, talc, mica, perlite, hollow ceramic spheres or a combination thereof. In an exemplary embodiment, the inorganic filler can include calcium carbonate. In an exemplary embodiment, the inorganic filler can be present in the first and second binding compositions in an amount from about 80% to about 98%, based on the respective weight of each composition.

Figure 4:
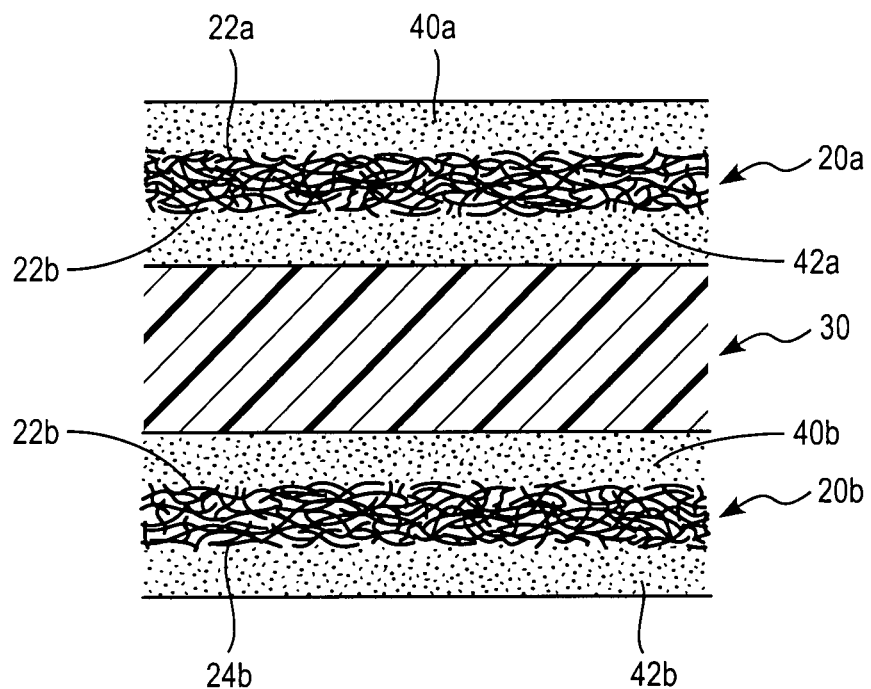
FIG. 4 is a cross-sectional view of an exemplary composite board according to one aspect of the present invention.

Referring to FIG. 4, in an exemplary embodiment, the composite board can include two glass fiber mats, a first glass fiber mat 20a and a second glass fiber mat 20b. The foam layer 30 can be arranged between and sandwiched by the first and second glass fiber mats 20a and 20b and attached to the first and second glass fiber mats 20a and 20b. Preferably the first and second glass fiber mats 20a and 20b are substantially fully adhered to the upper and lower surfaces of the foam layer 30.

Any method suitable for applying a binding composition or coating to a glass fiber mat or impregnating a glass fiber mat with a binding composition or coating may be used to apply the first binding composition to the upper surface of the at least one glass fiber mat and the second binding composition to the lower surface of the at least one glass fiber mat. The first and second binding composition can be applied by air spraying, dip coating, knife coating, roll coating, or film application such as lamination/heat pressing.

Figure 2:
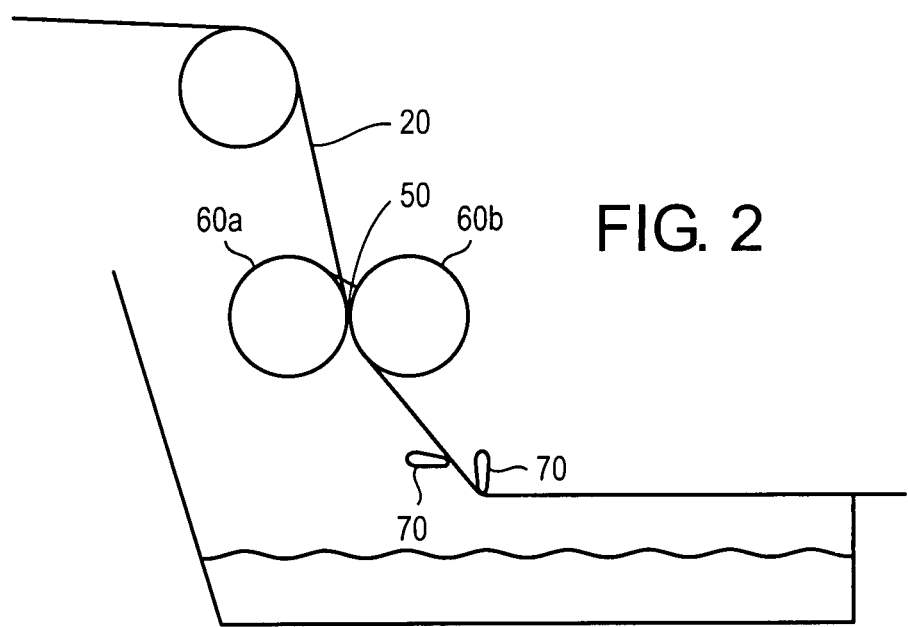
FIG. 2 is a schematic view of an exemplary roll coating apparatus utilized in coating a glass fiber mat, according to one aspect of the present invention.

For example, FIG. 2 depicts an exemplary system for roll coating the at least one glass fiber mat with the first and second binding compositions. Glass fiber mat 20 can be fed through a nip 50 created by a first applicator roll 60a and a second applicator roll 60b. The first applicator roll 60a can be continuously coated with the first binding composition and the second applicator roll 60b can be continuously coated with the second binding composition. The first applicator roll 60a transfers a puddle of the first binding composition to the upper surface of the glass fiber mat and the second applicator roll 60b transfers a puddle of the second binding composition to the lower surface of the glass fiber mat 20. Thus, the first applicator roll 60a applies the first binding composition to the upper surface and the second application roll 60b applies the second binding composition to the lower surface. Metering blades 70 can be used to remove any excess of the first and/or second binding compositions and/or level the first and/or second binding compositions.

Figure 3:
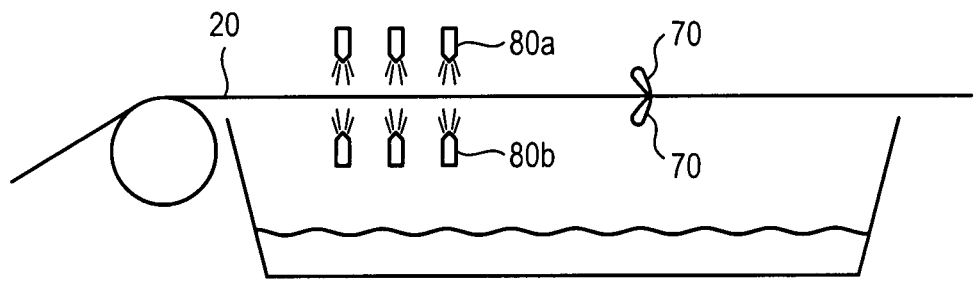
FIG. 3 is a schematic view of an exemplary air spraying apparatus utilized in coating a glass fiber mat, according to one aspect of the present invention.

FIG. 3 depicts an exemplary system for air spraying the first and second binding compositions onto the upper and lower surfaces of the at least one glass fiber mat 20. Glass fiber mat 20 can be fed between a first set of spaced apart, spray nozzles 80a and a second set of spaced apart, spray nozzles 80b. The first set of spaced apart, spray nozzles 80a face the upper surface of the glass fiber mat, while the second set of spaced apart, spray nozzles 80b face the lower surface of the glass fiber mat. The first set of spray nozzles 80a can emit the first binding composition onto the upper surface of the glass fiber mat and the second set of spray nozzles 80b can emit the second binding composition onto the lower surface of the glass fiber mat 20. Metering blades 70 can be used to remove any excess of the first and/or second binding compositions and/or level the first and/or second binding compositions.

The foam layer can be attached to the at least one glass mat by any suitable means, for example, through use of a laminating process. In an exemplary method of making the composite board, the at least one glass fiber mat can be unrolled and fed along a process line. The glass fiber mat has the first binding composition applied to its upper surface and the second binding composition applied to its lower surface. Thermosetting polymer foam can then be injected onto the upper surface of the glass fiber mat. The glass fiber mat and thermosetting polymer foam can then be sent through a laminator wherein the thermosetting polymer foam is heated and rises, cures, and adheres to the upper surface of the glass fiber mat. The composite board can be further processed, for example, by being cut into desired lengths.

In an alternative exemplary method of making the composite board, a first glass fiber mat can be unrolled and fed along a process line. The first glass fiber mat has the first binding composition applied to its upper surface and the second binding composition applied to its lower surface. Thermosetting polymer foam can then be injected onto the upper surface of the first glass fiber mat. Subsequently, a second glass fiber mat can be unrolled and fed along a process line. The second glass fiber mat has the first binding composition applied to its upper surface and the second binding composition applied to its lower surface. The second glass fiber mat can be fed above the thermosetting polymer foam and kept spaced apart from the thermosetting polymer foam. The glass fiber mat and thermosetting polymer foam can be sent through a laminator wherein the thermosetting polymer foam is heated and rises, cures, and adheres to the upper surface of the first glass fiber mat and the lower surface of the second glass fiber mat. The composite board can be further processed, for example, by being cut into desired lengths.

The composite board may be further coated with coatings on one or both of its sides. For example, if the composite board has a foam layer arranged between a first glass fiber mat and a second glass fiber mat, any existing free, uncoated surfaces of the first glass fiber mat and/or the free surface of the second glass fiber mat may be coated with at least one coating. In such embodiment, any coating overlays the first or second binding composition. Coatings include, for example, water repellent material, antifungal material, antibacterial material, a surface friction agent, a flame retardant material and algaecide. One type of coating may be applied to one side or both sides of the composite board. For example, if the composite board has a foam layer arranged between a first glass fiber mat and a second glass fiber mat, a water repellant material may be applied to the free surface of the first glass fiber mat and a flame retardant material may be applied to the free surface of the second glass fiber mat.

The composite board of the present invention can be useful in a variety of building applications. For example, the composite board may be used as roofing insulation, coverboard, sheathing, flooring underlayment, and tile backer.

The invention claimed is:

1. A composite board comprising:
   at least one glass fiber mat having an upper surface and a lower surface;
   a foam layer attached to the glass fiber mat; and
   a first binding composition applied to the upper surface of the at least one glass fiber mat which penetrates into the glass fiber mat beyond the upper surface, and a second binding composition applied to the lower surface of the at least one glass fiber mat which penetrates into the glass fiber mat beyond the lower surface, the first and second binding compositions being the same or different compositions, and the air permeability of the at least one glass fiber mat on which the first and second compositions have been applied is such that it takes at least 300 seconds for 300 cubic centimeters of air to pass through 1 square inch of the glass fiber mat.

2. The composite board according to claim 1, wherein the at least one glass fiber mat comprises first and second glass fiber mats, the foam layer being arranged between the first and second glass fiber mats and attached to each of the first and second glass fiber mats.

3. The composite board according to claim 1, wherein the first and/or second binding compositions penetrates into the glass fiber mat in an amount of at least 85%, based on the total thickness of the glass fiber mat.

4. The composite board according to claim 1, wherein the total penetration of the first and second binding compositions into the glass fiber mat is at least 85%, based on the total thickness of the glass fiber mat.

5. The composite board according to claim 1, wherein the glass fiber mat is substantially completely impregnated with the first and/or second binding compositions.

6. The composite board according to claim 1, wherein the foam layer comprises a thermosetting polymer foam.

7. The composite board according to claim 1, wherein the foam layer comprises polyisocyanurate foam.

8. The composite board according to claim 7, wherein the polyisocyanurate foam has a density of from about 1.5 pounds per cubic foot to about 25 pounds per cubic foot.

9. The composite board according to claim 1, wherein the foam layer has a thickness of from about 0.125 inch to about 6 inches.

10. The composite board according to claim 7, wherein the glass fiber mat has a thickness of from about 0.015 inch to about 0.05 inch.

11. The composite board according to claim 1, wherein each of the first and second binding compositions comprises a binder and an inorganic filler.

12. The composite board according to claim 11, wherein the binder comprises a latex.

13. The composite board according to claim 12, wherein the binder comprises a styrene butadiene rubber latex.

14. The composite board according to claim 12, wherein each of the first and second binding compositions further comprises a secondary organic binder.

15. The composite board according to claim 12, wherein each of the first and second binding compositions comprises from about 1% latex to about 15% latex, based on the respective weight of each binding composition.

16. The composite board according to claim 15, wherein each of the first and second binding compositions comprises from about 1% latex to about 5% latex, based on the respective weight of each binding composition.

17. The composite board according to claim 11, wherein the inorganic filler is selected from the group consisting of calcium carbonate, clay, talc, mica, perlite, hollow ceramic spheres and a combination thereof.

18. The composite board according to claim 1, wherein the at least one glass fiber mat has a weight of from about 50 grams per square meter to about 150 grams per square meter.

19. The composite board according to claim 1, wherein the at least one glass fiber mat has a coat weight of from about 350 grams per square meter to about 800 grams per square meter.

20. The composite board of claim 1, wherein the first and second binding compositions are different.

21. The composite board of claim 20, wherein the different binding compositions provide different properties to the glass mat.

* * * * *